United States Patent [19]
Hashimoto et al.

[11] Patent Number: 4,968,225
[45] Date of Patent: Nov. 6, 1990

[54] MAGNET HOLDER FOR ELECTROMAGNETIC DIAPHRAGM PUMP

[75] Inventors: Atsuki Hashimoto; Masaaki Tanabe, both of Tokyo, Japan

[73] Assignee: Nitto Kohki Co., Ltd., Japan

[21] Appl. No.: 446,428

[22] Filed: Dec. 5, 1989

[30] Foreign Application Priority Data

Dec. 27, 1988 [JP] Japan ............................ 63-167747[U]

[51] Int. Cl.$^5$ .............................................. F04B 45/04
[52] U.S. Cl. .................................... 417/413; 417/418; 310/17
[58] Field of Search ....................... 417/360, 413, 418; 310/15, 17, 23, 28, 30

[56] References Cited

U.S. PATENT DOCUMENTS

| 3,931,554 | 1/1976 | Spentzas | 310/30 X |
| 4,859,152 | 8/1989 | Kimura et al. | 417/418 X |
| 4,886,429 | 12/1989 | Osada et al. | 417/413 |

FOREIGN PATENT DOCUMENTS

| 56-42448 | 10/1981 | Japan. | |
| 57-080255 | 5/1982 | Japan | 310/15 |
| 59-117399 | 7/1984 | Japan | 310/15 |
| 61-137892 | 8/1986 | Japan. | |
| 61-252881 | 11/1986 | Japan. | |
| 63-100682 | 6/1988 | Japan. | |
| 63-134179 | 9/1988 | Japan. | |

Primary Examiner—Michael Koczo
Assistant Examiner—Eugene L. Szczecina, Jr.
Attorney, Agent, or Firm—Kinney & Lange

[57] ABSTRACT

A magnet holder for an electromagnetic diaphragm pump comprising a reinforcing member having at least in part thereof a width smaller than the distance between a pair of magnets placed in the predetermined positions in magnet insertion windows is provided integrally with the magnet holder between the pair of magnet insertion windows for juxtaposing and holding a pair of flat plate-shaped magnets in the same plane, so that the mechanical strength of the magnet holder is prevented from decreasing. And positioning members may be formed in the reinforcing member for pressing the pair of magnets inserted into the magnet insertion windows toward the diaphragms attached to opposite ends of the magnet holder, thereby positioning the magnets with enough accuracy and determining the distance between the magnets.

6 Claims, 10 Drawing Sheets

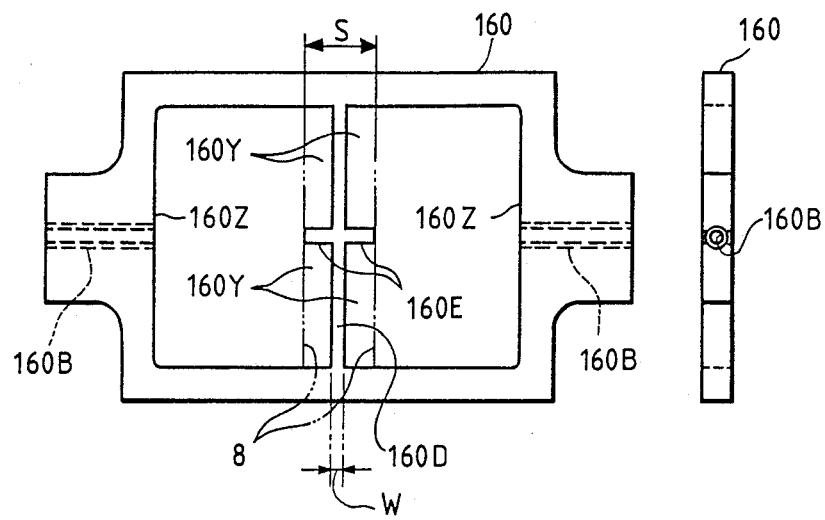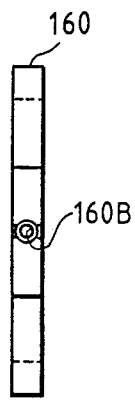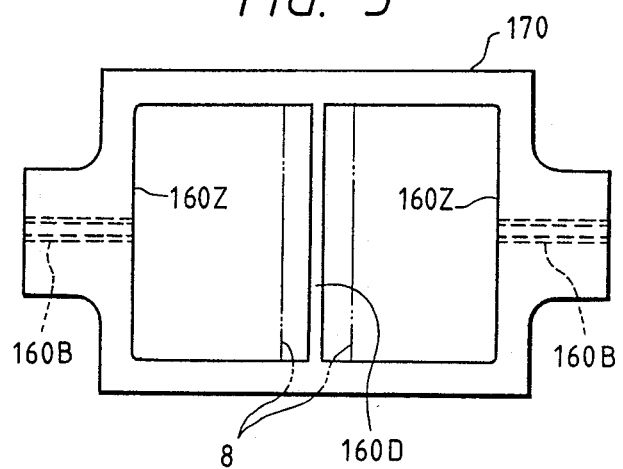

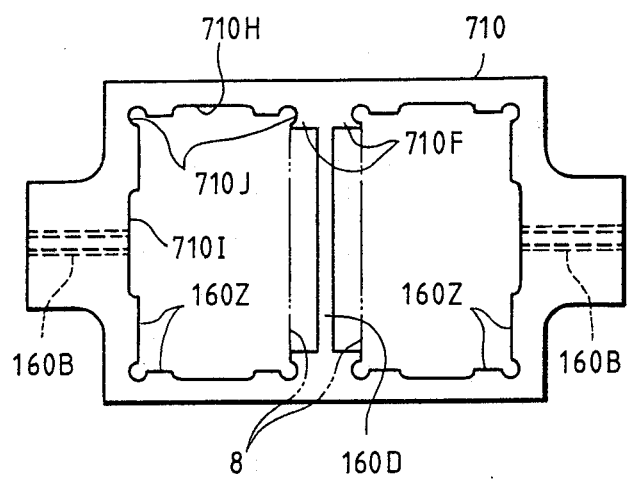
FIG. 6
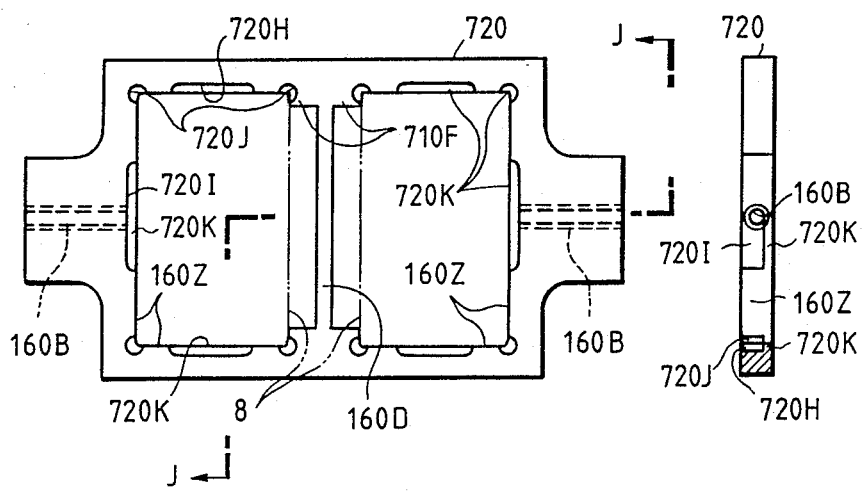
FIG. 7
FIG. 8

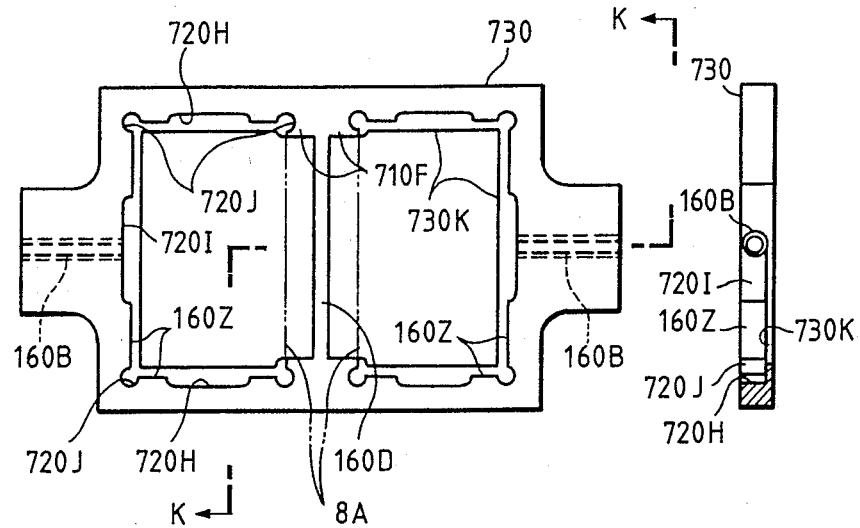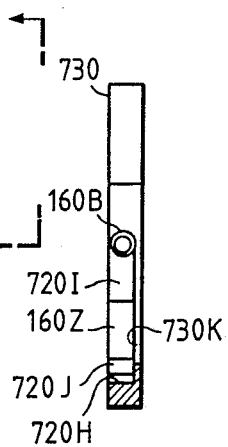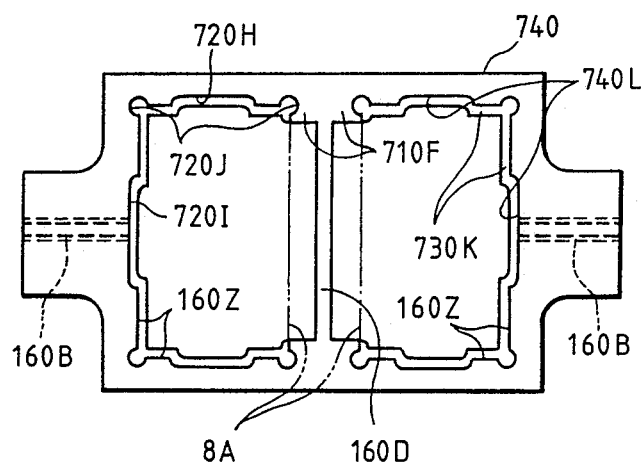

MAGNET HOLDER FOR ELECTROMAGNETIC DIAPHRAGM PUMP

BACKGROUND OF THE INVENTION

1. Field of the Invention

This invention relates to a magnet holder for an electromagnetic diaphragm pump, and particularly to a magnet holder for an electromagnetic diaphragm pump with improved efficiency.

2. Description of the Prior Art

A conventional electromagnetic diaphragm pump is described by using the drawings. FIG. 15 is a cross-sectional view when the conventional electromagnetic diaphragm pump is seen from the front thereof, FIG. 16 is a plan view of the diaphragm pump of FIG. 15, and FIG. 17 is a side view along the X—X line of FIG. 16.

In these figures, a housing 1 is made by the press operation of a metal plate and each of side plates 1A is punched with a circular hole 1B, the side plates being bent at both ends thereof so as to oppose each other.

A pair of diaphragm plates 2 made of an elastic material such as rubber are fitted into the circular holes 1B, respectively. The peripheral portion of each diaphragm 4 is pinched by and between corresponding the diaphragm plate 2 and a head cover 3, which are attached to the side plate 1A of the housing 1 using screws 18.

A pair of plate-like magnets 8 are held in a plate-like magnet holder 6 which is a part of an electromagnetic diaphragm pump and preferably formed of a material such as aluminium. The pair of diaphragm 4 are attached to both ends of the magnet holder 6 by using pressing tools 5 and screws 7. The magnet holder 6 and magnets 8 constitute the vibrator of the electromagnetic diaphragm pump.

Inside each head cover 3, a diaphragm chamber 3A is formed. On each diaphragm chamber 3A, there are formed an intake port 14A and a discharge port 15A, which are provided with an intake valve 14 and a discharge valve 15, respectively.

Each field core 9 is an iron core of laminated silicon steel plate in the shape of "E", and, as shown in FIG. 16, the central leg thereof is fitted in a coil 11 wound around a bobbin 10.

The electromagnetic diaphragm pump is provided with two such field cores 9, which are fixed to the bottom of the housing 1 using bolts 12 and nuts 13 so as to sandwich the magnet holder 6. Since it is needed to support the field cores 9 apart from the bottom of the housing 1 by a predetermined distance, a sleeve 16 is passed through with the bolt 12 as shown in FIG. 17.

Such electromagnetic diaphragm pump is attached through, for instance, rubber vibration insulators 19, to a fluid tank 20 as seen in FIG. 15. A pressurized fluid such as air is discharged into the tank 20 as shown by an arrow C via a tube 17 connected to the head cover 3.

FIG. 18 is a schematic plan view for showing the operation principle of the electromagnetic diaphragm pump. In FIG. 18, the symbols same as those in FIG. 15 or FIG. 17 indicate the same or identical portions.

A pair of magnets 8 attached to the magnet holder 6 are arranged, as shown, so that the magnetic poles of the pair of magnets 8 are reverse to each other. Accordingly, if the coil is supplied with an a.c. current so that a magnetic flux passes from one field core 9 to the other field core 9 in the direction of a solid arrow P or a dotted arrow Q, the magnet holder 6 is reciprocated in the direction of an arrow R by the attractive and repulsive actions between the magnets 8 and a magnetic flux P or Q, whereby the diaphragm 4 is vibrated.

As a result, as shown in FIG. 16 by an arrow A, a fluid is sucked into the diaphragm chamber 3A through the side plate 1A of the housing I, an opening 1D formed in the diaphragm plate 2 and bead cover 3, the intake port 14A and intake valve 14, and the fluid passes through the discharge port 15A and discharge valve 15 as shown by the arrow B and then the fluid is discharged from the tube 17 into the fluid tank 20 as shown by the arrow C in FIG. 15.

Such electromagnetic diaphragm pump is described in, for instance, the Japanese Patent Laid-open Publication No. Showa 61-252881 and the Utility Model Laid-open Publication Nos. Showa 63-100682 and 61-137892.

Various proposals have been made for improving the efficiency of the electromagnetic diaphragm pump.

In the Japanese Utility Model publication No. Showa 56-42448, a technique is disclosed for preventing an eddy current from occurring in the magnet holder 6 by completely removing the bridge portion 6A (FIG. 15) of the magnet holder 6 for holding a pair of magnets 8 which is between the magnets 8, in other words, by inserting a pair of magnets into a single common window by preventing the occurrence of the eddy current, the heat due to the eddy current is not generated in the holder even if the magnet holder is made of a conductive material, so that the electromagnetic energy loss of the electromagnetic diaphragm pump can be reduced and the efficiency thereof can be improved.

The Japanese Laid-open Utility Model Publication No. Showa 63-134179 discloses a technique in which the slits extending in the vibration direction of the magnet holder 6 are provided in both side portions 6B (FIG. 15) for preventing the occurrence of an eddy current.

In each prior art described above for preventing the occurrence of the eddy current, the bridge portion of the magnet holder between a pair of magnets is removed, or the slits are provided in both side portions of the magnet holder along the vibration direction. With such construction, since the mechanical strength of the magnetic holder is decreased, when a large stress is applied to the magnet holder by a strong magneticfield generated from the field cores which are arranged opposite to the magnets, the magnet holder can curve and, thereby, the ideal vibration of the magnet holder may be prevented.

That is, as shown in FIG. 18, a strong alternating magnetic field is generated between the pair of field cores 9 opposing to the pair of magnets B supported by the magnet holder 6, and the vibrator is made to reciprocate by the interaction of the above mentioned magnetic field with the magnetic fields produced from the magnets 8, but, since the vibrator is supported only by the diaphragms 4 formed of a flexible material such as rubber, it can be biased toward one of the field cores 9 during the reciprocating motion.

By the bias toward one of the field cores 9, a torsional force is produced in the magnet holder 6. As previously described, if the magnet holder 6 lacks the bridge portion 6A between the pair of magnets or the slits are provided in both side portions 6B of the magnet holder 6, the magnet holder 6 can twist because of its shortage of the mechanical strength, and thereby a normal reciprocating motion of the vibrator is prevented.

In addition, by this twist, the bonding agent fixing the magnet 8 to the magnet holder 6 may peel off whereby the magnets 8 may be disengaged from the magnet holder. As a result, the durability of the electromagnetic diaphragm pump will be reduced.

SUMMARY OF THE INVENTION

It is the object of this invention to provide a magnet holder for an electromagnetic diaphragm pump capable of improving the efficiency of the electromagnetic diaphragm pump without reducing the mechanical strength of the magnet holder.

Another object of the present invention is to provide a magnet holder and a vibrator for a diaphragm pump wherein any jigs are not required when one or plural magnets with the thickness smaller than that of he magnet holder are attached to the magnet holder to constitute the vibrator.

In order to accomplished above-mentioned objects, this invention is characterized in hat, between a pair of magnet insertion windows for juxtaposing and holding a pair of flat plate-shaped magnets in the same plane, a reinforcing member having at least in part thereof a width smaller than the distance between the pair of magnets placed in the predetermined positions in the magnet insertion windows is provided integrally with the magnet holder. With this construction the mechanical strength of the magnet holder is prevented from decreasing.

Also this invention is characterized in that positioning members are formed in the reinforcing member for pressing the pair of magnets inserted into the magnet insertion windows toward the diaphragms attached to opposite ends of the magnet holder, thereby positioning the magnets with enough accuracy and determining the distance between the magnets. As a result, the positioning of the magnets is enabled only by inserting the magnets into the magnet insertion windows.

The present invention is further characterized in that a stopper is formed on the inner perimeter of the side wall of the magnet insertion window in the vicinity of one main plane of the magnet holder, and that the supporting surface of the stopper for the magnet is fixed at the distance of ½ of the difference between the thicknesses of the magnet holder and the magnet to ba inserted into the magnet insertion window, from the one main plane. As a result, by merely inserting the magnet into the magnet insertion window to abut it against the supporting surface, the magnet can be arranged at the center of the magnet holder in the thickness direction thereof without using any jigs.

The present invention is still further characterized in that a plurality of said stoppers are formed partially along the inner periphery of the magnet insertion window. As a result, the mass of the vibrator becomes smaller and the inertia becomes smaller, too.

Further, there is also a characteristic feature in that recesses are formed in appropriate portions of the perimeter of the magnet insertion window, into which the bonding agent is made to flow. With this construction, the bonding agent easily flows in between the magnet and the magnet holder, whereby the fixing of the magnet becomes firmer.

BRIEF DESCRIPTION OF THE DRAWINGS

FIG. 1 is a front view of the first embodiment of the present invention.,

FIG. 2 is a side view of FIG. 1;

FIG. 3 is a front view of the second embodiment of the present invention,

FIG. 6 is a front view of the 1 fifth embodiment of the present invention;

FIG. 7 is a front view of the sixth embodiment of the present invention;

FIG. 8 is a partially cross-sectional side view along the J—J line of FIG. 7;

FIG. 9 is a front view of the seventh embodiment of the present invention,

FIG. 10 is a partially cross-sectional side view along the K—K line of FIG. 9;

FIG. 11 is a front view of the eighth embodiment of the present invention;

DETAILED DESCRIPTION OF THE PREFERRED EMBODIMENTS

Figure 12:
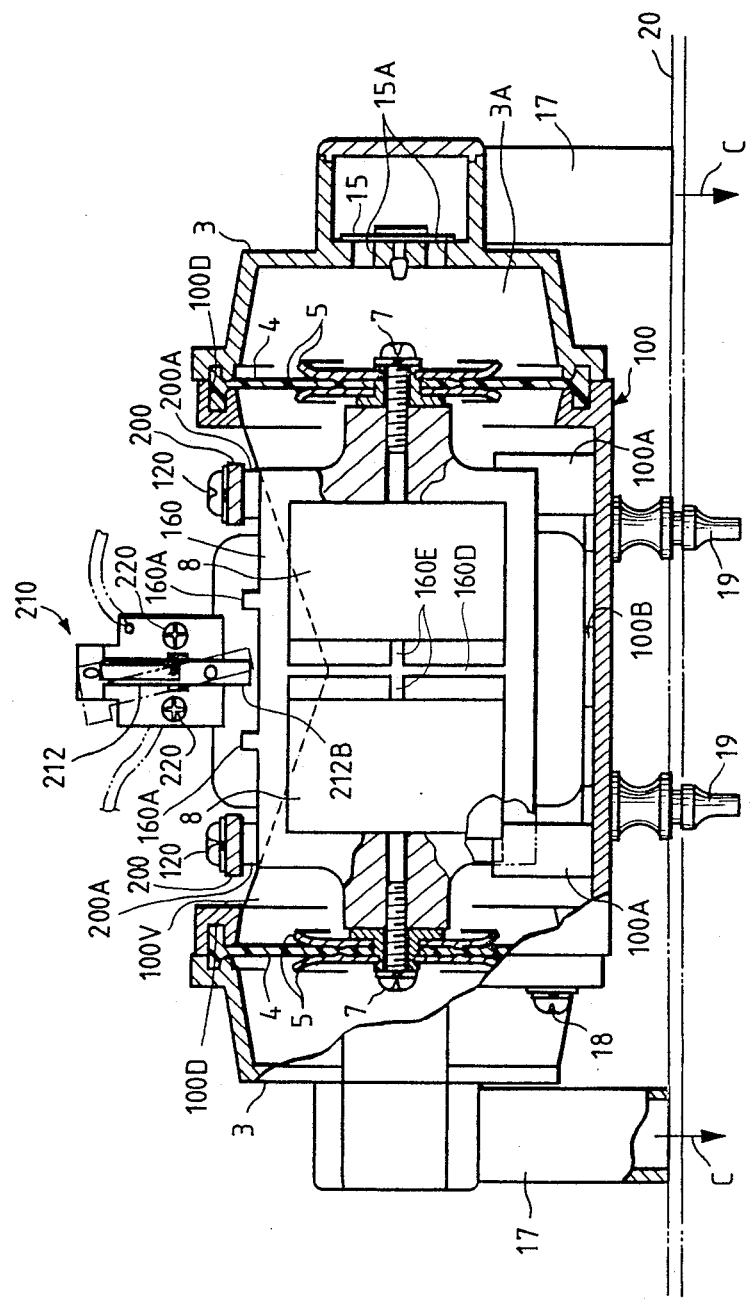
FIG. 12 is a partially cross-sectional front view of the electromagnetic diaphragm pump to which the first embodiment of the present invention has been applied.
Figure 13:
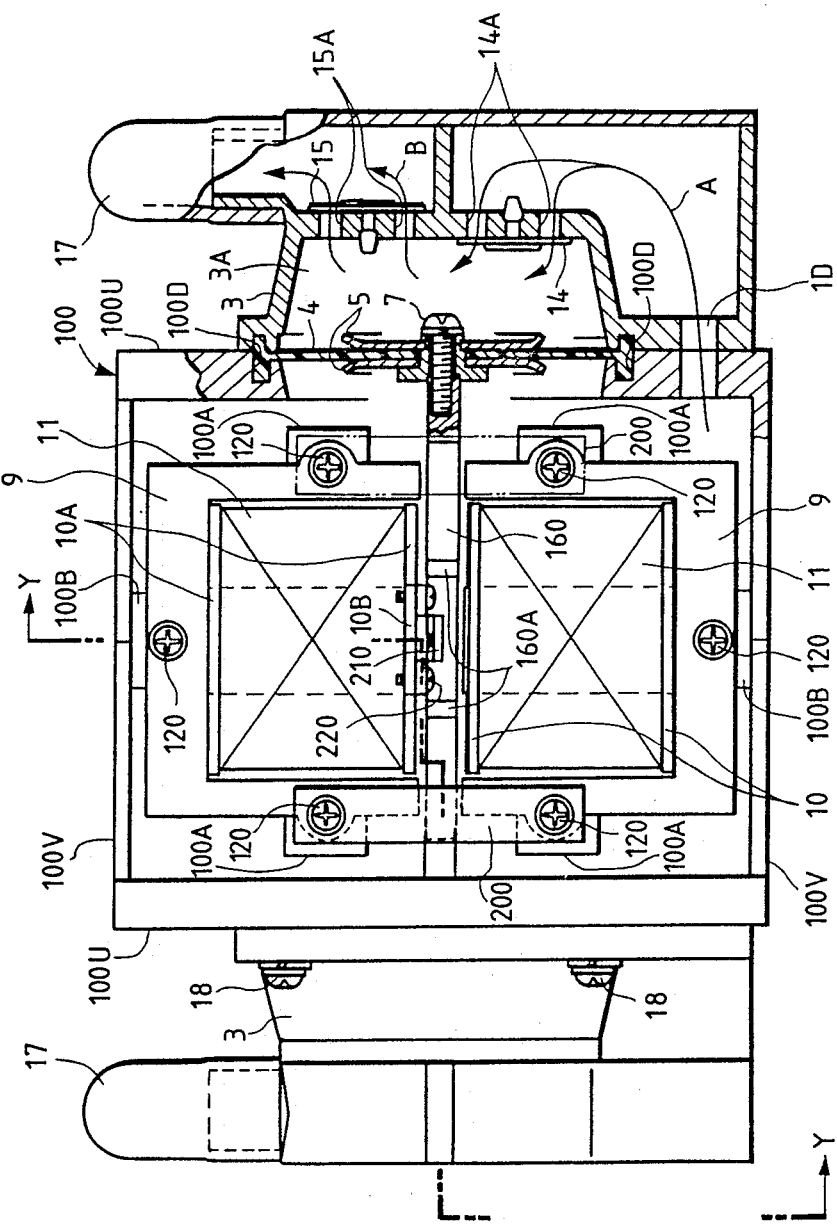
FIG. 13 is a partially cross-sectional plan view of the electromagnetic diaphragm pump of FIG. 12.
Figure 14:
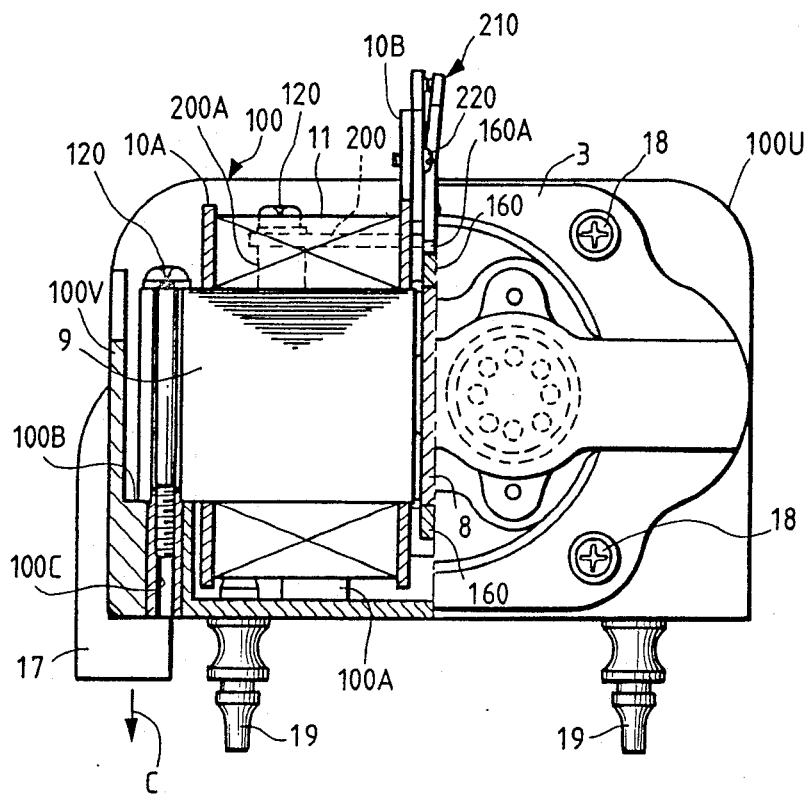
FIG. 14 is a partially cross sectional side view along the Y—Y line of FIG. 13.
Figure 15:
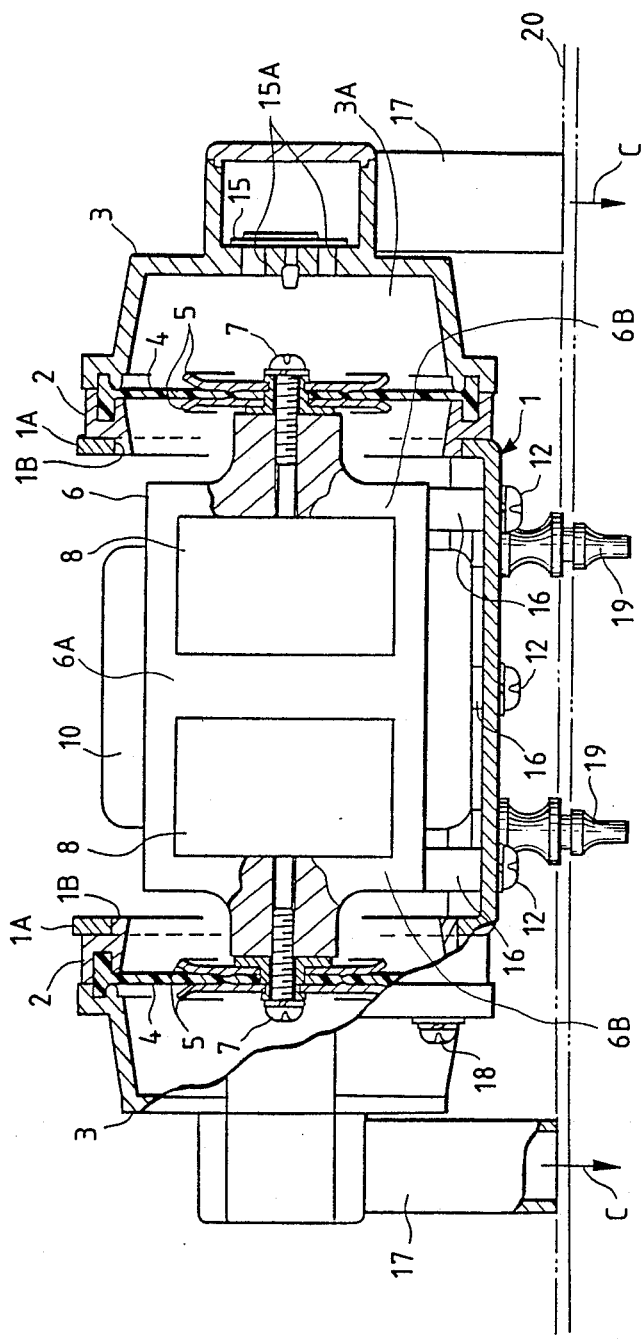
FIG. 15 is a partially cross-sectional front view of the prior art electromagnetic diaphragm pump
Figure 16:
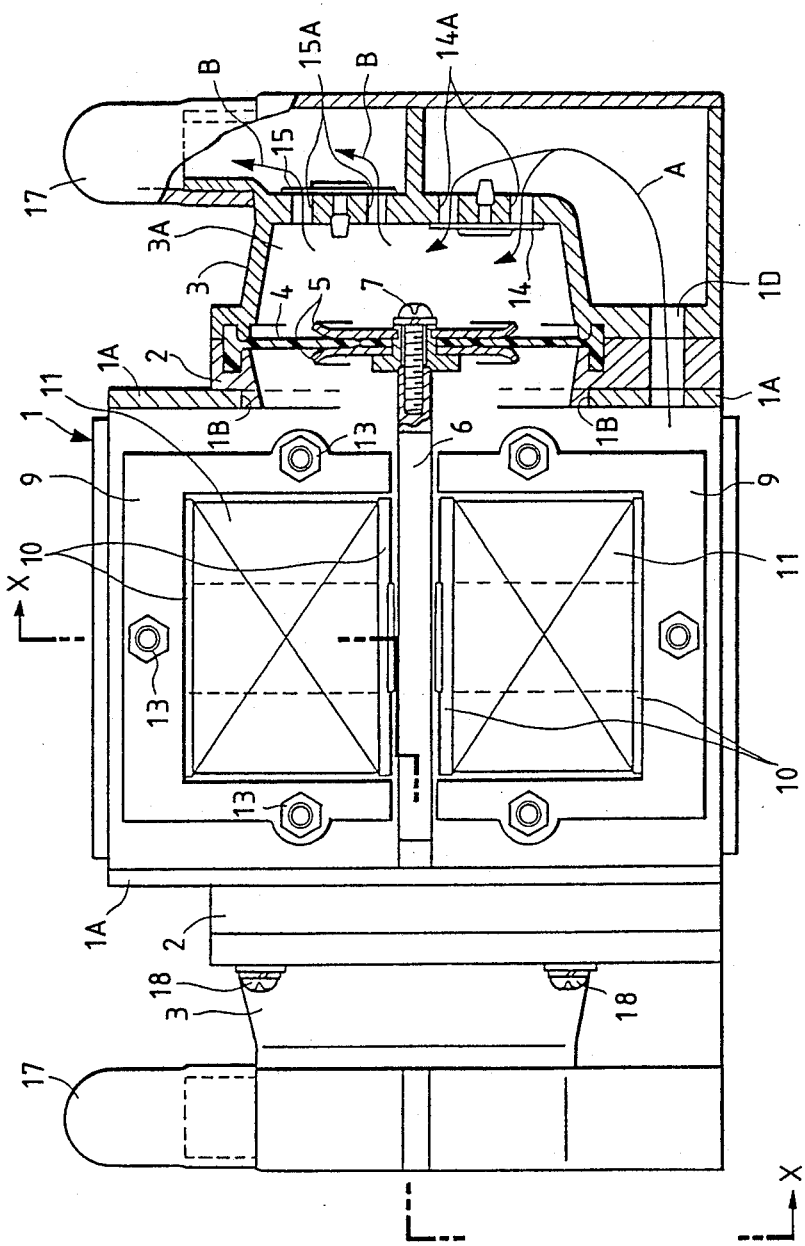
FIG. 16 is a partially cross-sectional plan view of the prior art electromagnetic diaphragm pump.
Figure 17:
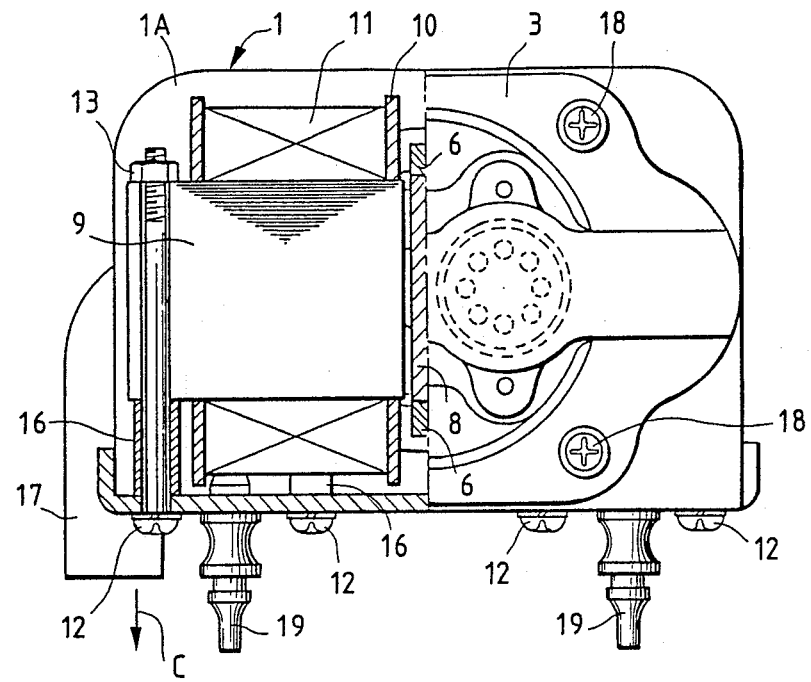
FIG. 17 is a partially cross-sectional side view along the X—X line of FIG. 16.
Figure 18:
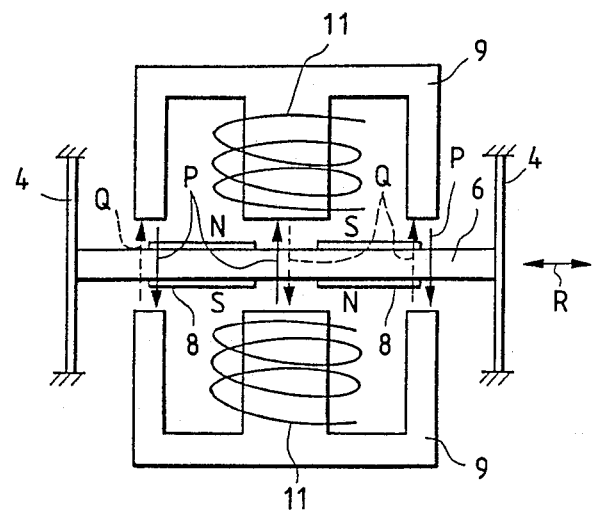
FIG. 18 is a schematic illustration showing the operation principle of the electromagnetic diaphragm pump.

Now, the present invention is described in detail with reference to the drawings. FIGS. 12-14 are illustrations similar to FIGS. 15-17 in which the symbols same as in FIG. 15-17, represent the same or identical portions, so the explanation therefor is omitted.

In FIGS. 12-14, a magnet holder 160 and a pair of magnets 8 constitute the vibrator of the electromagnetic diaphragm pump. The magnets 8, as described later with reference to FIG. 1, are inserted into the magnet insertion windows formed in the magnet holder 160 and are fixed thereto by bonding.

A housing 100 is a resin molding or a cast article of a metal such as aluminium. In the bottom of the housing 100, mounts 100A and 100B are integrally formed for positioning and fixing a pair of field cores 9. Through the mounts 100A and 100B, internal threads 100C are buried as shown in FIG. 14. Of course, if the housing 100 is made of a material such as a metal which has a sufficient mechanical strength, alternative screw holes may be formed through the mounts 100A and 100B.

Also, fitting portions or recess 100D are formed in the housing 100 for fitting the diaphragms 4. That is, a part corresponding to the conventional diaphragm plate 2 as shown in FIGS. 15 and 16 is integrally formed with the housing 100. Reinforcement such as ribs may be provided to the housing 100 as necessary to increase the mechanical strength thereof, though they are not shown.

On the mounts 100A and 100B of the housing 100 thus constructed, the field cores 9 having a coil attached thereto respectively are mounted and positioned. And, bolts 120 are screwed into the internal threads (screw holes) 100C formed through the mounts 100A and 100B, thereby fixing the field cores 9 to the mounts 100A and 100B.

If the housing 100 is molded of resin or the like, it is recommended that for the pair of field cores 9 opposing each other are fixed by the bolts 120 and reinforcing members 200. In order that the reinforcing members 200 are not brought in contact with the magnet holder 160, sleeves 200A are placed between the reinforcing members 200 and the field cores 9. By providing the reinforcing members 200, there will be no possibility that the housing may bend or the field cores 9 maY approach to each other even if a strong magnetic force acts between the opposed field cores 9.

Instead of the reinforcing members 200, alternate reinforcing members (not shown) may naturally be fixed by screwing or the like between a pair of side plates 100V which are orthogonal with the side plates 100U having fitting portions 100D therein and the bottom plate of the housing 100.

The magnet holder 160 has two clicks 160A on the upper edge surface thereof which are spaced apart by a predetermined distance. A projecting portion 10B is formed in the center of the upper edge of the portion of one bobbin 10A of the two bobbins having the coils 11 wound which is opposed to the other bobbin 10, and a power switch 210 is attached to the projecting portion 10B by a screw 220. 10C is a groove for leading out a lead wire which is not shown.

When the power switch 210 is oN, the pair of coils 11 is energized and the magnet holder 160 reciprocates with a predetermined frequency. This causes the diaphragms 4 to reciprocate whereby the fluid is discharged as shown by an arrow C. If there have been no breakage or the like in the diaphragms 4, the center of vibration of each click 160A is in the position shown in FIGS. 1 and 2 and the amplitude is within a small predefined range, so that the clicks 160A do not collide with a working end 212B of a lever 212 even when the clicks 160A vibrate.

If a crack or other damage occurs in at least one diaphragm 4, the vibration of the magnet holder 160 may be biased toward one diaphragm 4 to shift the center of vibration of each click 160A or the amplitude of the vibration may become greater, whereby at least one click 160A abuts on the working end 212B. As a result, the lever 212 swings about its supporting shaft and the electrical contacts of the switch 210 are open whereby the coils 11 are deenergized.

After renewing of the diaphragm 4, when the lever 212 is restored to the normal position to bring the electrical contact in contact again, the electromagnetic diaphragm pump is enabled to operate.

The clicks 160A of the magnet holder 160 are not required when the power switch 210 is not provided.

Now, the magnet holder 160 according to the present invention is described in detail with reference to FIGS. 1 and 2 where the clicks 160A shown in FIG. 12 are omitted.

The magnet holder 160 is a plate-like member having main surfaces coincident with its vibration direction, and at the opposite end portions thereof in the vibration direction, screw holes 160H for the screws 7 are formed as shown in FIGS. 12 and 13.

In the magnet holder 160, a pair of magnet insertion windows 160Z are formed for inserting and fixing the pair of magnets 8, and a bridge-like reinforcing member 160D having a width of W is left between these windows. Since the size of each window in the vibration direction of the holder is set to be larger than that of the magnets 8, a gap having a size of S including the width W of the reinforcing member 160D is left between the pair of magnets 8 if the magnets are placed in contact with the left and right ends of the respective windows, as shown in FIG. 1.

In the central part of the reinforcing member 160D, a pair of magnet pressers or magnet positioning members 160E are formed projecting to opposite sides thereof so as to bring the respective magnets in contact with the side edges of the corresponding magnet insertion windows at the sides of the diaphragms 4, thereby positioning the magnets 8 in the predetermined positions in FIG. 1.

By the reinforcing member 160D and the magnet pressers 160E, four spaces 160Y are formed between the pair of magnets 8 placed in the magnets insertion windows. Since the magnets 8 placed within the magnet insertion windows 160Z are positioned in the predetermined positions by the magnet pressers 160E, the magnets 8 can easily and accurately be placed.

When inserting the magnets 8 into the magnet insertion windows 160Z, a bonding agent is previously applied on the inside edges of the magnet insertion windows 160Z and the end or tip portion of the magnet pressers 160E. After placing the magnets 8 within the magnet insertion windows 160Z, a bonding agent can be applied on the regions of both main surfaces of the magnet holder which are contacted with the magnets for further securing the fixing of the magnets 8, if necessary.

When the magnets 8 are moved manually in the vibration direction of the vibrator so as to contact with the corresponding window frames near to the diaphragms after inserting the magnets 8 into the magnet insertion windows 160Z, the magnets pressers 160E are not necessary. Such example is shown in FIG. 3 which is a front view of the second embodiment of the present invention. In the figure, the same symbols as FIG. 1 represent the same or identical portions.

The magnet holder 170 in FIG. 3 is provided by removing the magnet pressers 160E from the magnet holder 160 of the first embodiment.

Figure 4:
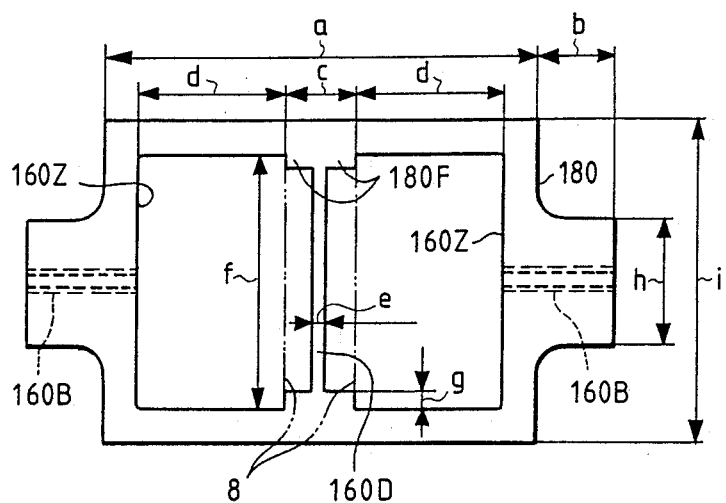
FIG. 4 is a front view of the third embodiment of the present invention.

The magnet pressers need not be provided in the central portion of the reinforcing member when providing magnet pressers in the reinforcing member. This example is shown in FIG. 4 which is a front view of the third embodiment of the present invention. In the figure, the same symbols as FIG. 1 represent the same or identical portions.

The magnet holder 180 of FIG. 4 is provided, in the opposite base portions of the reinforcing member 160D, with the magnet pressers 180F for positioning the magnets 8 in the magnet insertion windows 160Z.

The present inventors experimentally confirmed the performance of the electromagnetic diaphragm pump using the magnet holder, which has formed between the pair of magnet insertion windows 160Z, as described above, the reinforcing member having a width smaller than he distance S or C between the pair of magnets 8 placed at the predetermined positions in the magnet insertion windows 160Z. The result of this experiment is shown in Tables 1 and 2.

Table 1 shows the characteristics of the electromagnetic diaphragm pump which comprises the magnet holder 180 shown in FIG. 4. Table 2 shows the characteristics of the electromagnetic diaphragm pump which comprises the conventional magnet holder 6 shown in FIG. 15.

Regarding the sizes of the various portions of the magnet holder 180 of FIG. 4, a is 70 mm, b is 14 mm, c is 11 mm, d is 25.4 mm, e is 1.5 mm, f is 42.4 mm, g is 3.7 mm, h is 20 mm and i is 50 mm, and the thickness of the magnet holder 180 is 6 mm.

The sizes of the magnet holder 6 shown in FIG. 15 are the same as those of the magnet holder 180 except e which is same as c. The shapes and sizes of other parts except the magnet holder are all same in both diaphragm pumps, for instance, each diameter of the diaphragms 4 is 73 mm and the thickness thereof is 1.78 mm.

TABLE 1

| discharge pressure [kgf/cs²] | 50 [Hz] | | | 60 [Hz] | | |
| --- | --- | --- | --- | --- | --- | --- |
| | flow rate [l/min] | current I [A] | power P [W] | flow rate Q [l/min] | current I [A] | power P [W] |
| open | 121 | 2.00 | 82 | 131 | 2.03 | 101 |
| 0.10 | 98 | 2.01 | 78 | 112 | 1.95 | 95 |
| 0.15 | 81 | 2.00 | 73 | 97 | 1.87 | 89 |
| 0.18 | 71 | 1.99 | 70 | 89 | 1.84 | 85 |
| 0.25 | 48 | 1.97 | 59 | 66 | 1.70 | 73 |
| 0.30 | 30 | 1.95 | 49 | 49 | 1.62 | 64 |
| 0.35 | — | — | — | 32 | 1.55 | 51 |

TABLE 2

| discharge pressure [kgf/cm²] | 50 [Hz] | | | 60 [Hz] | | |
| --- | --- | --- | --- | --- | --- | --- |
| | flow rate [l/min] | current I [A] | power P [W] | flow rate Q [l/min] | current I [A] | power P [W] |
| open | 125 | 2.14 | 100 | 130 | 2.21 | 110 |
| 0.10 | 101 | 2.15 | 95 | 107 | 2.08 | 103 |
| 0.15 | 82 | 2.12 | 88 | 90 | 1.98 | 97 |
| 0.18 | 71 | 2.10 | 84 | 81 | 1.94 | 92 |
| 0.25 | 46 | 2.05 | 72 | 60 | 1.80 | 81 |
| 0.30 | 29 | 2.03 | 62 | 45 | 1.72 | 71 |
| 0.35 | — | — | — | 30 | 1.64 | 61 |

The voltage applied to the coils wound around the field cores was a.c. 100 V, and the experiment was performed with both power frequencies of 50 Hz and 60 Hz. The power consumption was measured using a wattmeter. The "discharge pressure" means the pressure of the fluid which is discharged from the tube 17 of FIG. 12 or 15, and the discharge pressure is "open" means that the tube 17 is opened to the atmosphere.

Although not shown in Tables 1 and 2, when the tube 17 was closed in the magnet holder 180 shown in FIG. 4, the discharge pressure is 0.40 kgf/cm², the current I is 1.92 A and the power consumption P is 31 W for the power frequency of 50 Hz, and the discharge pressure is 0.44 kgf/cm², the current I is 1.48 A and the power consumption P is 27 W for 60 Hz. On the other hand, when the tube 17 was closed in the magnet holder 6 of FIG. 15, the discharge pressure is 0.42 kgf/cm², the current I is 2.00 A and the power consumption P is 43 W for the frequency of 50 Hz, and the discharge pressure is 0.46 kgf/cm², the current I is 1.56 A and the power consumption P is 38 W for 60 Hz.

Incidentally, the rated discharge pressure of the electromagnetic diaphragm pump was 0.15 kgf/cm².

As apparent from Tables 1 and 2, if the magnet holder for an electromagnetic diaphragm pump according to the present invention was used, the power consumption P decreased by 7-21% as compared with the conventional magnet holder even if the flow rate Q was substantially same.

When the magnet holder 180 according to the present invention was used, the heat generated within the magnet holder 180 was hardly recognized. 1 rom this fact, it is understood that little eddy current was induced in the magnet holder.

Figure 5:
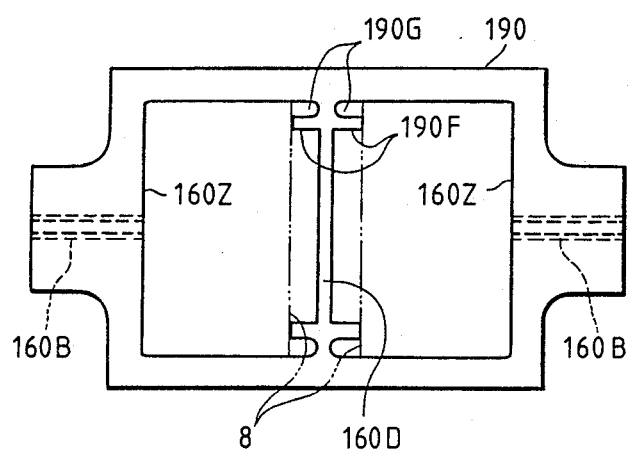
FIG. 5 is a front view of the fourth embodiment to the present invention.

FIG. 5 is a front view of the fourth embodiment of this invention In the figure, the same symbols as FIG. 4 represent the same or identical portions.

In the magnet holder 190 shown in FIG. 5, the magnet pressers 190F for positioning the magnets 8 to be placed in the magnet insertion windows 160Z are formed at the places inwardly spaced from both ends of the reinforcing member 160D by a predetermined distance. In other words, recessed portions 190G are formed, respectively, between the inside wall of the magnet insertion windows 160Z and the magnet pressers 190F to open to the windows 160Z.

As stated above, a bonding agent is applied on the inside walls of the magnet insertion windows 160Z and the tip portions of the magnet pressers 190F prior to insertion the magnets 8 Into the magnet insertion windows 160Z. If the recessed portions 190G are further filled with the bonding agent after the mounting of the magnets 8, the bonding agent easily flows into the gaps between the magnet holder 190 and the tip portions of the magnet pressers 190F and the magnets 8, whereby the bonding of the magnets 8 is more firmly preformed.

FIG. 6 is a front view of the fifth embodiment of the present invention which is a variation of the fourth embodiment. In the figure, the same symbols as FIG. 5 represent the same or identical portions.

In this embodiment, the magnet pressers 710F are formed in the neighborhood of both ends of the reinforcing member 160D as in the magnet holder 190 shown in FIG. 5. The recessed portions 710H, 710I and 710J are formed in the inner walls of the magnet insertion windows 160Z so that a plurality of gaps are formed in the contact regions of the magnet holder 710 and the magnets 8 to the extent that the positioning of the magnets 8 are not adversely affected when the magnets 8 are inserted into the magnet insertion windows 160Z.

According to his embodiment, if the recessed portions 710H, 710I and 710J are filled with a bonding agent after the insertion of the magnets 8 into the magnet insertion windows 160Z, the bonding agent easily flows into the gap between the magnet holder 710 and the magnets 8, whereby the bonding of the magnets 8 can be more firmly performed.

The sixth embodiment of the present invention is shown in the FIGS. 7 and 8 in which the same symbols as FIG. 6 represent the same or identical portions. This embodiment is a variation of the fifth embodiment.

In FIGS. 7 and 8, the recessed portions 720H, 720I and 720J are formed in each inner wall of the magnet insertion windows 160Z of the magnet holder as in the magnet holder 710, these recessed portions 720H, 720I and 720J are the inner wall of the magnet insertion window 160Z and formed only in the vicinity of the one main surface of the magnet holder 720. In other words, in the other main surface side of the magnet holder 710 opposite to the recessed portions 720H, 720I and 720J, cover members or stepwise portions 720K are left so as to cover these recessed portions, as well shown in FIG. 8.

According to this embodiment, even if the recessed portions 720H, 720I and 720J are filled with a bonding agent prior to the insertion of the magnets, the bonding agent is rarely squeezed out to the other main surface side of the magnet holder by the insertion of the magnets, so that the filling work of the bonding agent can easily be done and the quality of the products can be improved.

The seventh embodiment of the present invention is shown in the FIGS. 9 and 10 in which the same symbols as FIGS. 7 and 8 represent the same or identical portions. This embodiment is a variation of the sixth embodiment.

In FIGS. 9 and 10, the recessed portions 720H, 720I and 720J are formed in the inner wall of the magnet insertion window 160Z only on the one main surface side of the magnet holder 730 same as in the case of the magnet holder 720, and in addition, on the other main surface side of the magnet holder 730, the stoppers 730K extending inwardly are formed to prepare holes which are smaller than the size of the magnet insertion window 160Z, or smaller than the contour shape of the magnets 8.

The thickness of the magnet holder 6 is usually same as the thickness of the magnet 8. ;nd, since the magnet 8 with comparatively small magnetic force can be used if the requested flow rate or output pressure of the electromagnetic diaphragm pump is small. The smaller the thickness of the magnet, the more inexpensive the cost of the electromagnetic diaphragm pump can be made, which is convenient. However, since the magnet holder 6 is required to have formed therein the threaded holes 160B for attaching the diaphragms 4, it is not allowed to be thinner than a certain thickness.

Therefore, sometimes the magnet holder 6 having a thickness greater than that of the magnet must be used for attaching the magnet. In this case, a predetermined jig is required for attaching the magnet.

In such case, by setting the thickness of the stoppers 730K shown in FIGS. 9 and 10 to be equal to ½ of the difference between &he thickness of the magnet holder 730 and that of the magnets 8A, the centers of the magnets 8A and the magnet holder 730 in the thickness direction thereof can be made to accurately match each other only by inserting the magnets 8A into the insertion windows 160Z and mounting them on the supporting surfaces of he stoppers 730K thereby to eliminate the need for any jigs.

The eighth embodiment of this invention is shown in the FIG. 11 here the same symbols as FIGS. 9 and 11 represent the same or identical portions. This embodiment is a variation of the seventh embodiment.

In the magnet holder 740, the recessed portions 720I, 720H and 720J and the stoppers 730K are formed same as in the case of the magnet holder 730. The recessed portions 740L are formed in the stoppers 730K as shown in FIG. 11.

The recesses 740L are filled with a bonding agent when or after the magnet 8A is inserted into the magnet insertion window 160Z. This will make the bonding agent easily flow in between the magnet BA and the magnet holder 740, whereby the fixing of the magnet 8A to the magnet holder 740 can be accomplished more firmly.

As apparent from the above description, the following technical advantages can be achieved by the present invention.

Since, between the pair of magnets insertion windows, a reinforcing member is provided integrally with the magnet holder, which reinforcing member has a width at least partially smaller than the distance between the magnets to be placed in the predetermined positions within the magnet insertion windows, the mechanical strength of the magnet holder is kept enough to prevent the twist and/or strain thereof, thereby the efficiency of the electromagnetic diaphragm pump can be increased.

When the positioning means are formed in the reinforcing member for pressing the pair of magnets to be inserted into the magnet insertion windows toward the diaphragms to be attached to both ends of the magnet holder, thereby determining the distance between the magnets, the positioning of the magnets is performed only by inserting the magnets into the magnet insertion windows.

The magnets can be placed at the center of the magnet holder in the thickness direction thereof without using any jigs or the like, whereby said vibrator can easily be assembled.

The magnets and the magnet holder can firmly be fixed only by bonding them at the portions in the main surface of the magnet holder opposite to the side on which the stoppers are formed after inserting the magnets into the magnet insertion windows. That is, only by fixing only one side of the magnets to the magnet holder with a bonding agent, the magnets can firmly be fixed to the magnet holder. Accordingly, the vibrator can more easily be assembled.

Moreover, since one side of each magnet abuts on the supporting surface of the stopper, a fear that the bonding agent fixing the magnet and magnet holder peels off from the magnet or the magnet holder and the magnet run off from the magnet holder reduces to half as compared with the prior art. More specifically, in the conventional magnet holder in which no stopper is formed, the bonding agent for fixing the magnets and magnet holder is applied on both main surfaces of the magnet holder, so is the bonding agent peeled off, the magnets could run off either side of the magnet holder, but in accordance wi h the present invention, the magnets never run off from the side at which they abut on the stopper.

Electromagnetic loss due to the eddy current caused by the alternation of the magnetic flux passing through the vibrator can be reduced even if the holder is made of a conductive material such as aluminium, so the efficiency of the electromagnetic diaphragm pump is increased.

If recesses are formed along the periphery of the magnet insertion window and a bonding agent is made to flow into the recesses, the bonding agent easily flows in between the magnet and the magnet holder, whereby the bonding of the magnet to the magnet holder can more firmly be achieved.

As a result, the mounting of the magnets becomes easy, and the productivity of the electromagnetic diaphragm pump is increased.

What is claimed is:

1. A plate-like magnet holder for an electromagnetic diaphragm pump having opposite ends adapted to be connected to a pair of diaphragms which are placed apart so as to be opposed to each other, provided with a pair of magnet insertion windows between the opposite ends for juxtaposing and holding a pair of plate-shaped magnets in the same plane and in the direction connecting the opposite ends, and adapted to reciprocate in the direction connecting the opposite ends by causing an alternating magnetic field to act on the main surfaces of the plane-shaped magnets, the plate-like magnet holder comprising a reinforcing member provided integrally with the magnet holder between the pair of magnet insertion windows, the reinforcing member having in at least a part thereof a width smaller than the spacing to be left between the respective magnets when the magnets are placed in the predetermined positions of the respective magnet insertion windows.

2. A magnet holder as set forth in claim 1 wherein at least one positioning means for the magnets are formed on the reinforcing member for determining the spacing between the pair of magnets to be separately placed in the respective magnet insertion windows.

3. The magnet holder for the electromagnetic diaphragm pump as claimed in claim 1 wherein the magnet holder supporting at least one magnet having a thickness smaller than that of the magnet holder, and comprising stoppers adapted for supporting and positioning the magnet to be inserted in the insertion window, said stopper being formed so as to project inwardly from at least a part of the inner periphery of the side wall of the magnet insertion windows in the vicinity of one main surface of the magnet holder, and the distance from the one main surface to the supporting surface of the stoppers being set to substantially 1/2 of the difference between the thickness of the magnet holder and that of the magnets.

4. The magnet holder for the electromagnetic diaphragm pump as claimed in claim 3 wherein the stoppers are formed at least in a plural number and partially along the inner periphery of the side wall of the magnet insertion windows.

5. The magnet holder for the electromagnetic diaphragm pump as claimed in claim 1 wherein there are formed in said magnet insertion windows recesses for filling a bonding agent between the magnets and the magnet holder.

6. The magnet holder for the electromagnetic diaphragm pump as claimed in claim 3 wherein there are formed in said magnet insertion windows recesses for filling a bonding agent between the magnets and the magnet holder.

* * * * *

UNITED STATES PATENT AND TRADEMARK OFFICE
CERTIFICATE OF CORRECTION

PATENT NO. : 4,968,225
DATED : November 6, 1990
INVENTOR(S) : Atsuki Hashinoto et al.

It is certified that error appears in the above-identified patent and that said Letters Patent is hereby corrected as shown below:

Col. 11, line 23, delete "plane-shaped", insert --plate-shaped--.

Signed and Sealed this

Fifth Day of May, 1992

Attest:

DOUGLAS B. COMER

*Attesting Officer*        *Acting Commissioner of Patents and Trademarks*